(12) United States Patent
Yeo et al.

(10) Patent No.: US 8,598,587 B2
(45) Date of Patent: Dec. 3, 2013

(54) OPTICAL SENSOR

(75) Inventors: Yun Jong Yeo, Seoul (KR); Hong-Kee Chin, Suwon-si (KR); Byeong Hoon Cho, Seoul (KR); Ki-Hun Jeong, Cheongan-si (KR); Jung Suk Bang, Guri-si (KR); Woong Kwon Kim, Cheonan-si (KR); Sung Ryul Kim, Asan-si (KR); Dae Cheol Kim, Hwaseong-si (KR); Kun-Wook Han, Seongnam-si (KR)

(73) Assignee: Samsung Display Co., Ltd., Yongin (KR)

( * ) Notice: Subject to any disclaimer, the term of this patent is extended or adjusted under 35 U.S.C. 154(b) by 145 days.

(21) Appl. No.: 13/209,188

(22) Filed: Aug. 12, 2011

(65) Prior Publication Data

US 2012/0248452 A1 Oct. 4, 2012

(30) Foreign Application Priority Data

Apr. 1, 2011 (KR) .......................... 10-2011-0030239

(51) Int. Cl.
*H01L 31/0376* (2006.01)

(52) U.S. Cl.
USPC .......... 257/60; 257/53; 257/66; 257/E31.049; 257/E33.073

(58) Field of Classification Search
None
See application file for complete search history.

(56) References Cited

U.S. PATENT DOCUMENTS

| 2007/0210344 A1* | 9/2007 | Arao et al. | 257/232 |
| 2011/0109609 A1* | 5/2011 | Jeong et al. | 345/211 |

* cited by examiner

*Primary Examiner* — Minh-Loan T Tran
*Assistant Examiner* — Fazli Erdem
(74) *Attorney, Agent, or Firm* — H.C. Park & Associates, PLC

(57) ABSTRACT

An optical sensor preventing damage to a semiconductor layer, and preventing a disconnection and a short circuit of a source electrode and a drain electrode, and a manufacturing method of the optical sensor is provided. The optical sensor includes: a substrate; an infrared ray sensing thin film transistor including a first semiconductor layer disposed on the substrate; a visible ray sensing thin film transistor including a second semiconductor layer disposed on the substrate; a switching thin film transistor including a third semiconductor layer disposed on the substrate; and a semiconductor passivation layer enclosing an upper surface and a side surface of an end portion of at least one of the first semiconductor layer, the second semiconductor layer, and the third semiconductor layer.

20 Claims, 28 Drawing Sheets

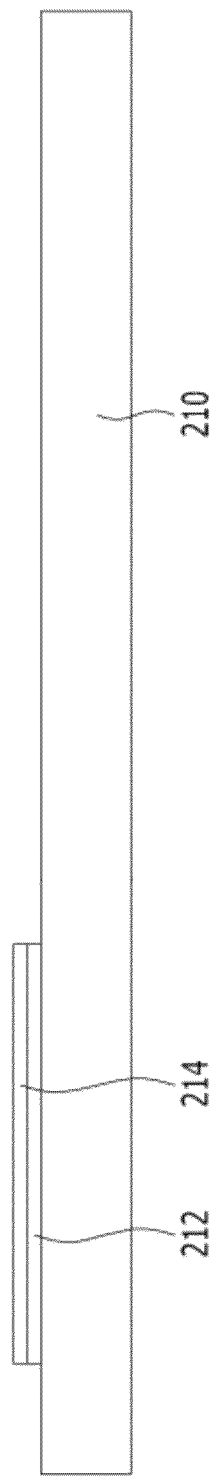

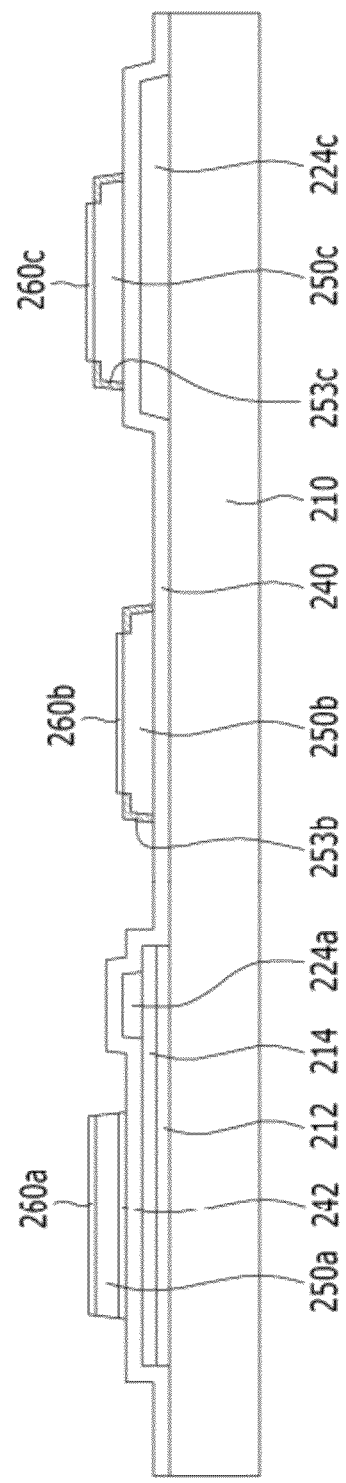

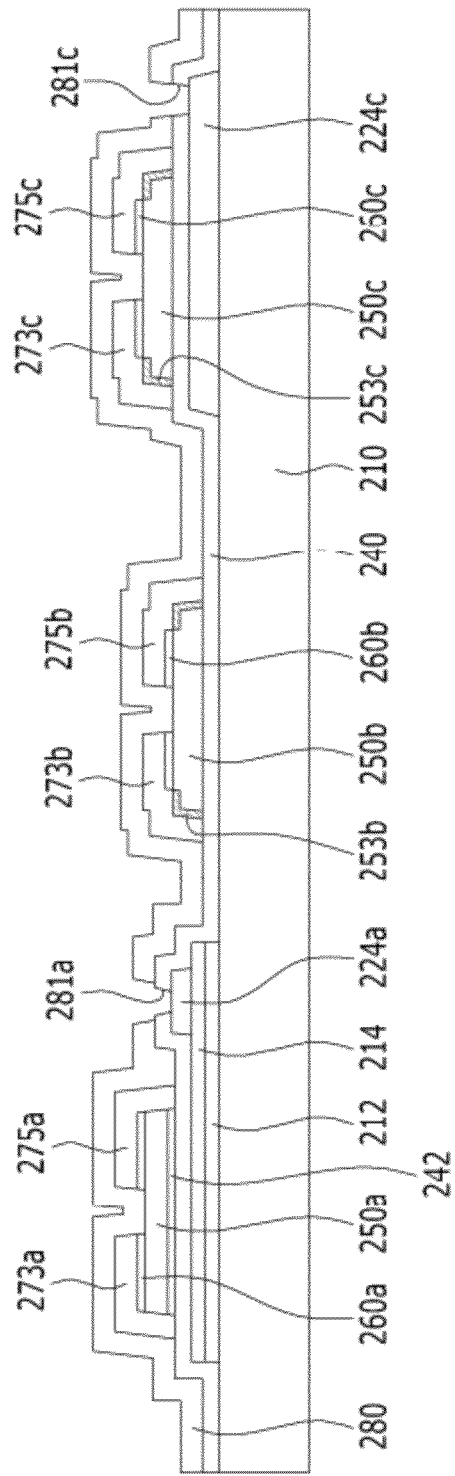

OPTICAL SENSOR

CROSS REFERENCE TO RELATED APPLICATION

This application claims priority to and the benefit of Korean Patent Application No. 10-2011-0030239 filed in the Korean Intellectual Property Office on Apr. 1, 2011, the entire contents of which are incorporated herein by reference.

BACKGROUND OF THE INVENTION

1. Field of the Invention

Exemplary embodiments of the present invention relate to an optical sensor and a manufacturing method of an optical sensor. More particularly, exemplary embodiments of the present invention relate to an optical sensor that prevents damage to a semiconductor layer, that prevents a short circuit, and that prevents a disconnection of a source electrode and a drain electrode, and a manufacturing method of the optical sensor.

2. Discussion of the Background

A liquid crystal display (LCD), as a flat panel display that is most widely used at present, is a display device that is constituted by two substrates with electrodes and a liquid crystal layer interposed therebetween to control the amount of light transmitted by rearranging liquid crystal molecules of a liquid crystal layer by applying a signal to the electrodes.

Recently, research on liquid crystal displays having a touch sensing function or an image sensing function has been undertaken. To realize the touch sensing function and the image sensing function, a light sensor including an infrared ray sensing thin film transistor, a visible sensing thin film transistor, and a switching thin film transistor may be added to the liquid crystal display.

The infrared ray sensing thin film transistor has different characteristics from the visible ray sensing thin film transistor and the switching thin film transistor, and therefor the semiconductor layer of the infrared ray sensing thin film transistor is formed of different materials than the semiconductor layers of the visible ray sensing thin film transistor and the switching thin film transistor. Accordingly, one dry etch process is required to form the semiconductor layer of the infrared ray sensing thin film transistor and one dry etch process is required to form the semiconductor layers of the visible ray sensing thin film transistor and the switching thin film transistor. That is, two dry etch processes are executed to form the semiconductor layers.

Here, if the semiconductor layers of the visible ray sensing thin film transistor and the switching thin film transistor is firstly formed, the semiconductor layers of the visible ray sensing thin film transistor and the switching thin film transistor may be damaged in the process of forming the semiconductor layer of the infrared ray sensing thin film transistor as a following process.

In contrast, if the semiconductor layer of the infrared ray sensing thin film transistor is firstly formed, the semiconductor layer of the infrared ray sensing thin film transistor may be damaged in the process of forming the semiconductor layers of the visible ray sensing thin film transistor and the switching thin film transistor as the following process.

When forming the semiconductor layer as the following process, an insulating layer may be formed under the semiconductor layer, however, as shown in FIG. 1 and FIG. 2, this insulating layer remains on the semiconductor layer that is firstly formed such that a step due thereto is large, and thereby a short circuit or a disconnection of the overlying source electrode and drain electrode may be generated.

Also, an etch stopper may be formed on the semiconductor layer that is firstly formed, however, as shown in FIG. 3 and FIG. 4, the etch stopper may be corroded by a chlorine-based gas (including $Cl_2$) used when etching the semiconductor layer. Accordingly, as shown in FIG. 5, the semiconductor layer positioned under the etch stopper may be deteriorated, and the short circuit and the disconnection of the overlying source electrode and drain electrode may be generated.

The above information disclosed in this Background section is only for enhancement of understanding of the background of the invention and therefore it may contain information that does not form any portion of the prior art nor what the prior art may suggest to a person of ordinary skill in the art.

SUMMARY OF THE INVENTION

Exemplary embodiments of the present invention provide an optical sensor that prevents damage of a semiconductor layer, and a short circuit and a disconnection of a source electrode and a drain electrode in a process for executing two etch processes of forming semiconductor layers of an infrared ray sensing thin film transistor, a visible ray sensing thin film transistor and a switching thin film transistor with different materials, and a manufacturing method of the optical sensor.

Exemplary embodiments of the present invention also provide an optical sensor that prevents deterioration of a characteristic of a sensor due to interface oxidation in an intermediate process for forming a plurality of layers through a CVD process by exposing the layers outside a vacuum state and a manufacturing method of the optical sensor.

Exemplary embodiments of the present invention further provide an optical sensor that prevents an influence of corrosion of an etch stopper for a semiconductor layer and a manufacturing method of the optical sensor.

Additional features of the invention will be set forth in the description which follows, and in part will be apparent from the description, or may be learned by practice of the invention.

An exemplary embodiment of the present invention discloses an optical sensor that includes a substrate and an infrared ray sensing thin film transistor including a first semiconductor layer disposed on the substrate. A visible ray sensing thin film transistor including a second semiconductor layer disposed on the substrate and a switching thin film transistor including a third semiconductor layer disposed on the substrate are also included in the optical sensor. A semiconductor passivation layer encloses an upper surface and a side surface of an end portion of at least one of the first semiconductor layer, the second semiconductor layer, and the third semiconductor layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 9A, FIG. 9B, FIG. 9C, FIG. 9D, FIG. 9E, FIG. 9F, FIG. 9G, FIG. 9H and FIG. 9I are cross-sectional views of an exemplary embodiment of a manufacturing method of an optical sensor according to the first exemplary embodiment of the present invention.

DETAILED DESCRIPTION OF THE ILLUSTRATED EMBODIMENTS

Figure 1:
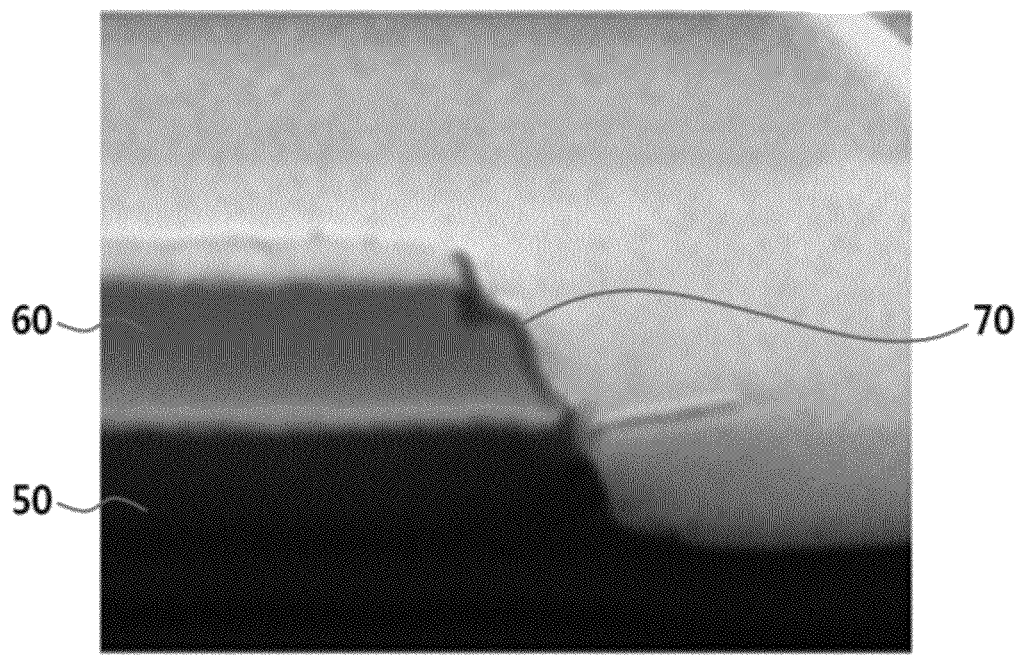
FIG. 1, FIG. 2, FIG. 3, FIG. 4 and FIG. 5 are views showing problems that may be generated in a manufacturing process of an optical sensor.
Figure 2:
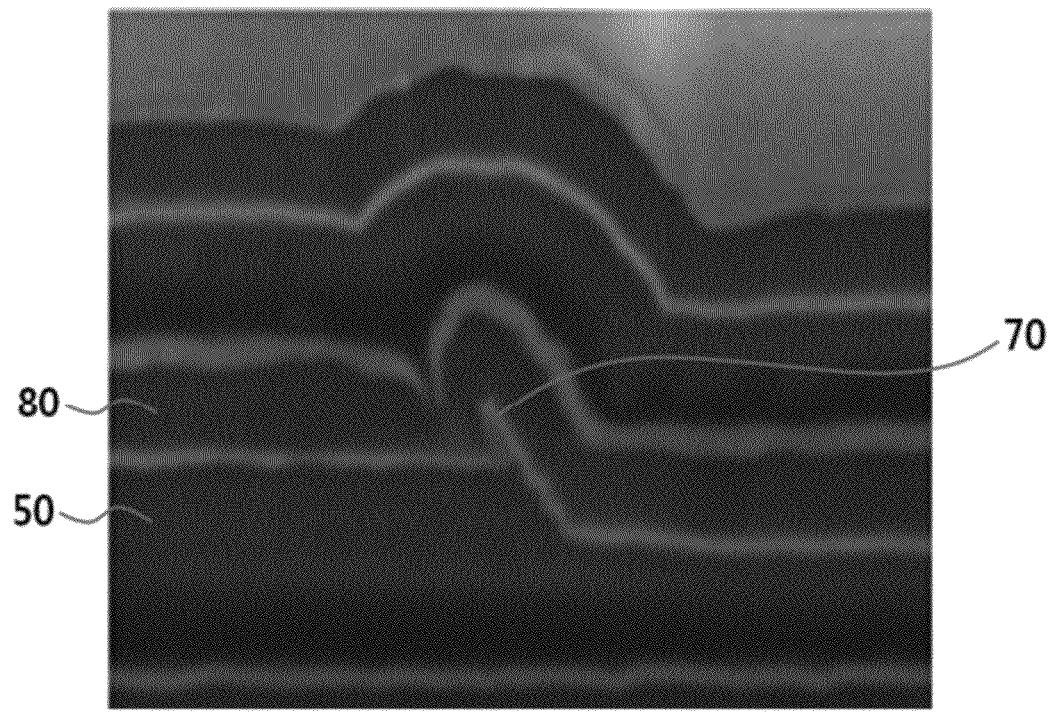
Figure 3:
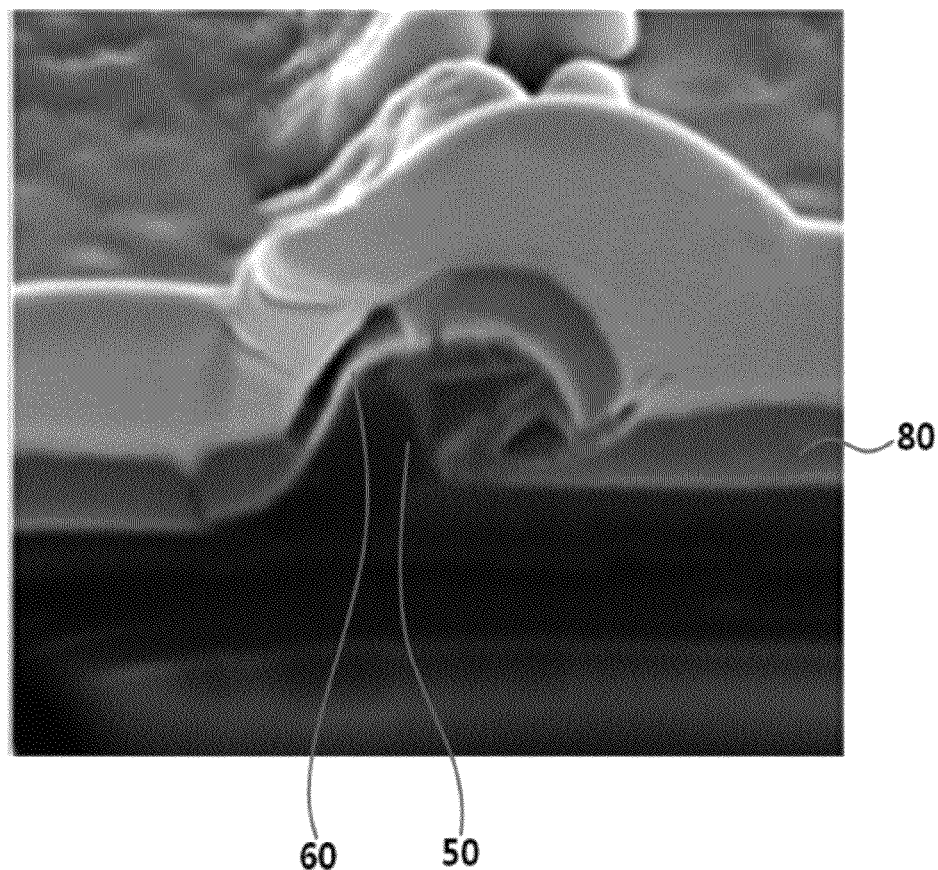
Figure 4:
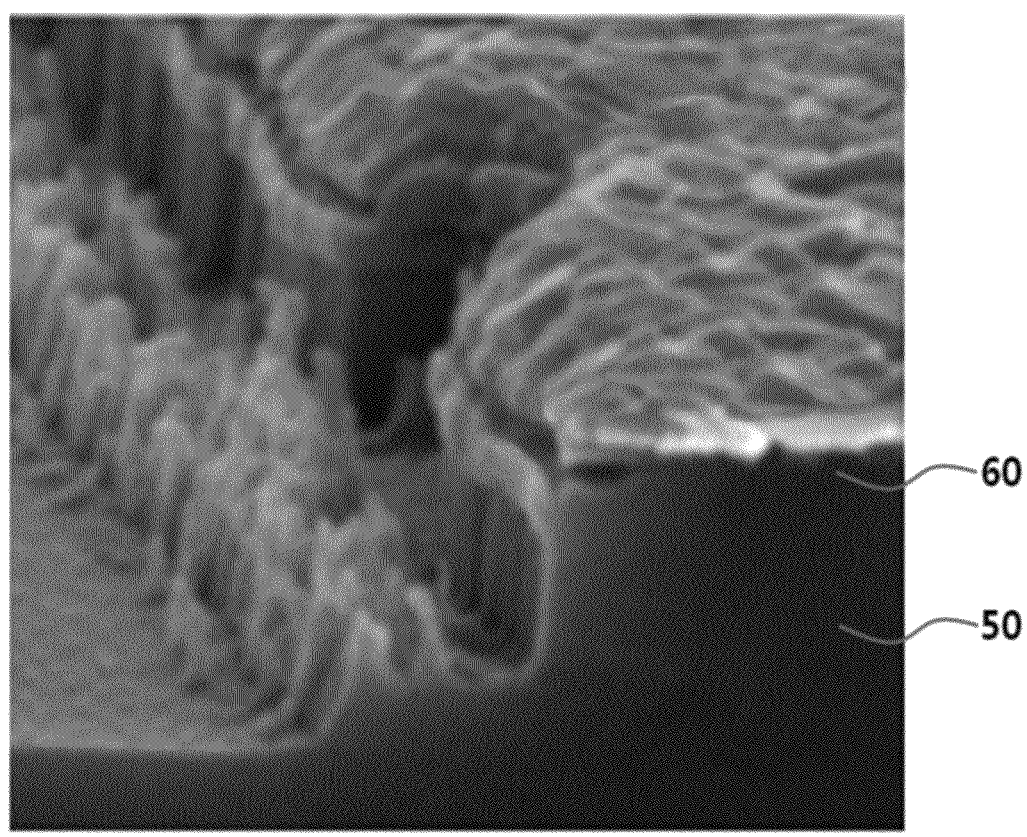
Figure 5:
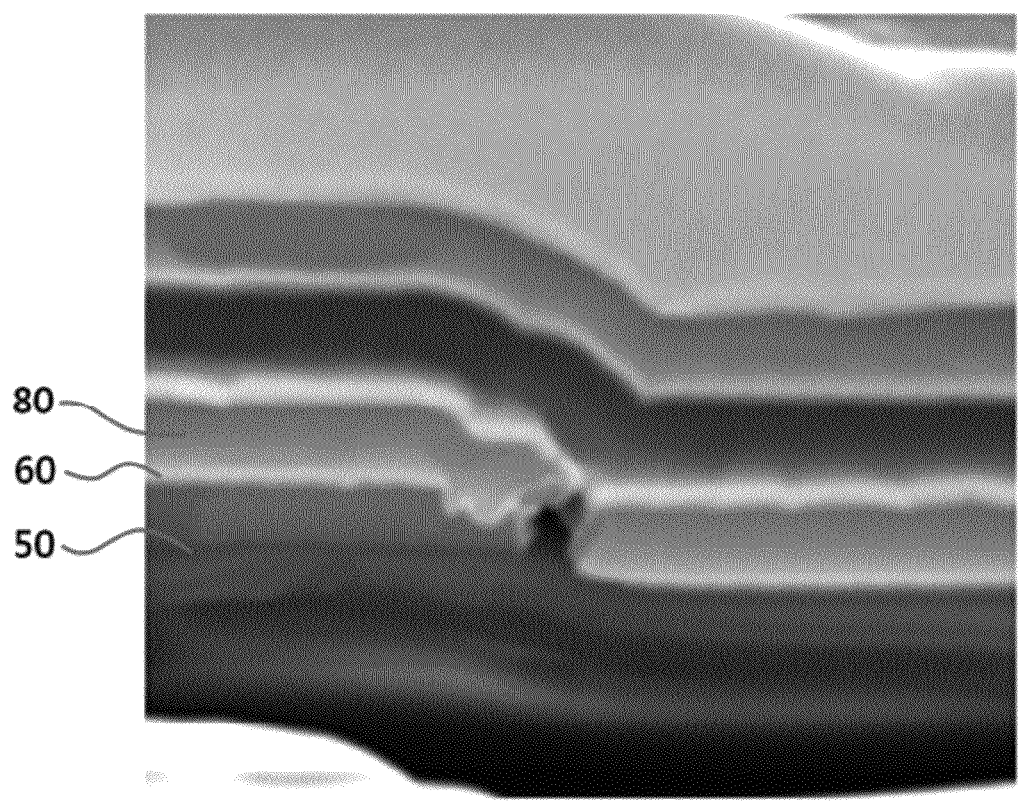

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" or "connected to" another element, it can be directly on or directly connected to the other element, or intervening elements may also be present. In contrast, when an element is referred to as being "directly on" or "directly connected to" another element, there are no intervening elements present. It will be understood that for the purposes of this disclosure, "at least one of" will be interpreted to mean any combination of the enumerated elements following the respective language, including combinations of multiples of the enumerated elements. For example, "at least one of X, Y, and Z" will be construed to mean X only, Y only, Z only, or any combination of two or more items X, Y, and Z (e.g. XYZ, XZ, YZ).

Firstly, an optical sensor according to the first exemplary embodiment of the present invention will be described with reference to accompanying drawings.

Figure 6:
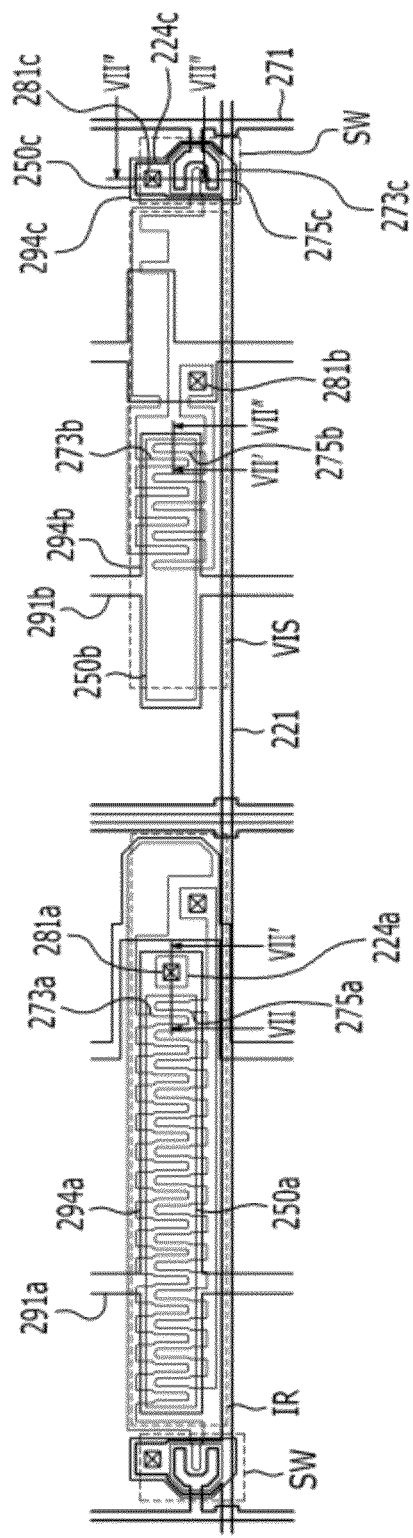
FIG. 6 is a top plan view of an optical sensor according to an exemplary embodiment of the present invention.
Figure 7:
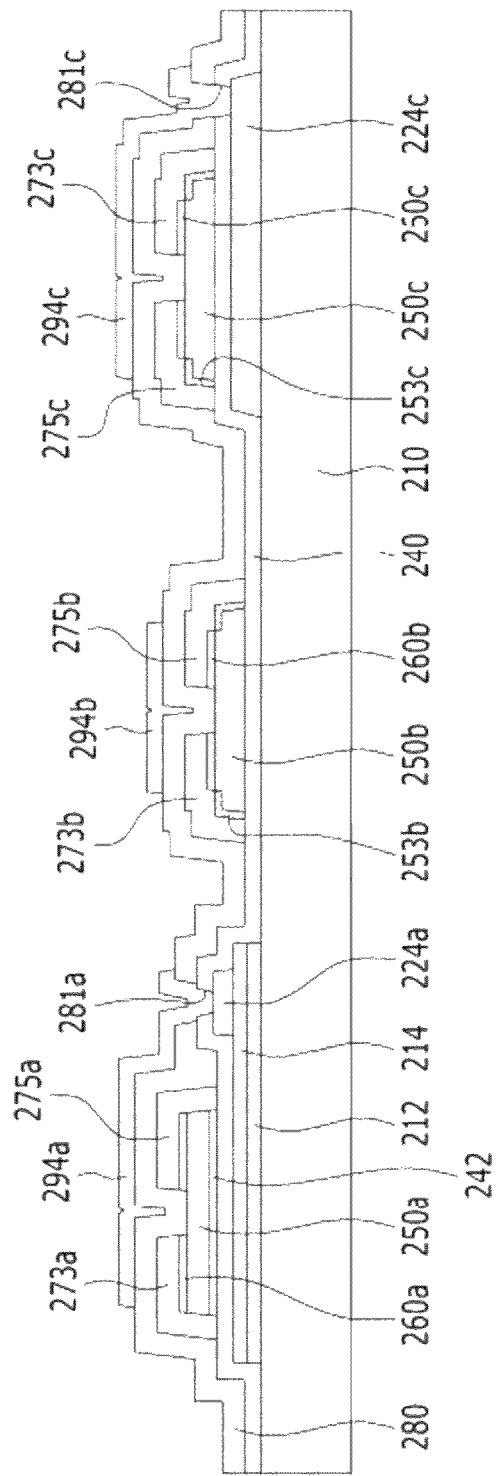
FIG. 7 is a cross-sectional view of an optical sensor taken along line VII-VII' of FIG. 6 according to a first exemplary embodiment of the present invention.

FIG. 6 is a top plan view of an optical sensor according to an exemplary embodiment of the present invention, and FIG. 7 is a cross-sectional view of an optical sensor taken along line VII-VII' of FIG. 6 according to the first exemplary embodiment of the present invention.

An optical sensor according to the first exemplary embodiment of the present invention includes a substrate 210 made of transparent glass or a plastic, a plurality of gate lines 221 and data lines 271 disposed on the substrate 210 and crossing each other, a switching thin film transistor SW connected to the gate line 221 and the data line 271, and an infrared ray sensing thin film transistor IR and a visible ray sensing thin film transistor VIS connected to the switching thin film transistor SW.

A plurality of pixels are defined by the gate lines 221 and the data lines 271, one switching thin film transistor SW and one infrared ray sensing thin film transistor IR may be connected in one pixel, and one switching thin film transistor SW and one visible ray sensing thin film transistor VIS may be connected in the adjacent pixel.

The infrared ray sensing thin film transistor IR includes a first semiconductor layer 250a disposed on the substrate 210, a first ohmic contact layer 260a disposed on the first semiconductor layer 250a, a first source electrode 273a and a first drain electrode 275a disposed on the first ohmic contact layer 260a, a fourth insulating layer 280 disposed on the first source electrode 273a and the first drain electrode 275a, and a first upper gate electrode 294a disposed on the fourth insulating layer 280.

The first semiconductor layer 250a may be made of amorphous silicon germanium (a-SiGe). The amorphous silicon germanium (a-SiGe) is a material having high quantum efficiency for an infrared ray region. Here, the first semiconductor layer 250a may be made of materials other than amorphous silicon germanium (a-SiGe), and any material having high quantum efficiency for the infrared ray region is possible.

The first source electrode 273a and the first drain electrode 275a are spaced apart from each other, thereby forming a channel in the first semiconductor layer 250a between the first source electrode 273a and the first drain electrode 275a. The first ohmic contact layer 260a is disposed on the first semiconductor layer 250a except for the channel.

Also, the infrared ray sensing thin film transistor IR may further include a first insulating layer 212 and a light blocking member 214 disposed on the substrate 210 and positioned under the first semiconductor layer 250a, a first lower gate electrode 224a disposed on the light blocking member 214, a second insulating layer 240 disposed on the light blocking member 214 and the first lower gate electrode 224a, and a third insulating layer 242 disposed on the second insulating layer 240.

The first insulating layer 212 may be formed with silicon nitride (SiNx), thereby improving adherence between the substrate 210 and the light blocking member 214.

The light blocking member 214 prevents visible rays from being incident to the first semiconductor layer 250a. The first semiconductor layer 250a has high quantum efficiency for the infrared ray region, however it also has high quantum efficiency for the visible ray region, thereby receiving the influence of visible rays such that an aim is to prevent the visible rays from being incident to the first semiconductor layer 250a. The light blocking member 214 may be made of the amorphous germanium (a-Ge). The infrared rays pass through amorphous germanium (a-Ge) well, however the visible rays are hardly passed. The light blocking member 214 may be made of a compound of amorphous germanium instead of amorphous germanium (a-Ge), and any material through which the infrared rays pass well and the visible rays are hardly passed is possible.

The first lower gate electrode 224a is disposed on a portion of the light blocking member 214. The second insulating layer 240 and the fourth insulating layer 280 have a first contact hole 281a exposing the first lower gate electrode 224a. The first upper gate electrode 294a is connected to the first lower gate electrode 224a through the first contact hole 281a. Accordingly, the first lower gate electrode 224a receives the same voltage as that applied to the first upper gate electrode 294a such that the light blocking member 214 may be prevented from being in a floating state.

The third insulating layer 242 may be made of silicon nitride(SiNx), thereby improving the interface characteristics between the second insulating layer 240 and the first semiconductor layer 250a.

The visible ray sensing thin film transistor VIS includes a second semiconductor layer 250b disposed on the substrate 210, a second semiconductor passivation layer 253b enclosing the upper surface and the side surface of the end portion of the second semiconductor layer 250b, a second ohmic contact layer 260b disposed on the second semiconductor layer 250b, a second source electrode 273b and a second drain electrode 275b disposed on the second ohmic contact layer 260b, the fourth insulating layer 280 disposed on the second source electrode 273b and the second drain electrode 275b, and a second gate electrode 294b disposed on the fourth insulating layer 280.

The second semiconductor layer 250b may be made of amorphous silicon (a-Si). The amorphous silicon (a-Si) is a material having high quantum efficiency for the visible ray region, thereby having a high sensitivity for the visible ray region even though the light of the infrared ray region is incident. Here, the second semiconductor layer 250b may be made of materials other than amorphous silicon (a-Si), and any material having high quantum efficiency for the visible ray region is possible.

The second semiconductor passivation layer 253b may be made of silicon oxide (SiOx). The second semiconductor passivation layer 253b may be formed by processing the second semiconductor layer 250b through plasma oxidation. The side surface of the second semiconductor layer 250b may be prevented from being damaged by the second semiconductor passivation layer 253b made of the silicon oxide.

The second source electrode 273b and the second drain electrode 275b are spaced apart from each other, thereby forming the channel in the second semiconductor layer 250b. The second ohmic contact layer 260b is disposed on the second semiconductor layer 250b except for the channel and a portion where the second semiconductor passivation layer 253b is disposed. That is, the boundaries of the second semiconductor passivation layer 253b and the second ohmic contact layer 260b accord with each other.

The switching thin film transistor SW includes a third semiconductor layer 250c disposed on the substrate 210, a third semiconductor passivation layer 253c enclosing the upper surface and the side surface of the end portion of the third semiconductor layer 250c, a third ohmic contact layer 260c disposed on the third semiconductor layer 250c, a third source electrode 273c and a third drain electrode 275c disposed on the third ohmic contact layer 260c, the fourth insulating layer 280 disposed on the third source electrode 273c and the third drain electrode 275c, and a third upper gate electrode 294c disposed on the fourth insulating layer 280.

The third semiconductor layer 250c may be made of amorphous silicon (a-Si).

The third semiconductor passivation layer 253c may be formed of silicon oxide (SiOx). The third semiconductor passivation layer 253c may be formed through plasma oxidation. Damage to the side surface of the third semiconductor layer 250c may be prevented by the third semiconductor passivation layer 253c made of the silicon oxide.

The third source electrode 273c and the third drain electrode 275c are spaced apart, thereby forming the channel in the third semiconductor layer 250c. The third ohmic contact layer 260c is disposed on the third semiconductor layer 250c except for the channel and the portion where the third semiconductor passivation layer 253c is formed. That is, the boundaries of the third semiconductor passivation layer 253c and the third ohmic contact layer 260c accord with each other.

The third source electrode 273c is connected to the data line 271, thereby receiving the data voltage from the data line 271.

The third drain electrode 275c is connected to the first source electrode 273a in the pixel where the switching thin film transistor SW is connected to the infrared ray sensing thin film transistor IR. The third drain electrode 275c is connected to the second source electrode 273b in the pixel where the switching thin film transistor SW is connected to the visible ray sensing thin film transistor VIS.

The switching thin film transistor SW may further include a third lower gate electrode 224c disposed on the substrate 210 and positioned under the third semiconductor layer 250c, and the second insulating layer 240 disposed on the third lower gate electrode 224c.

The second insulating layer 240 and the fourth insulating layer 280 have a third contact hole 281c exposing the third lower gate electrode 224c. The third upper gate electrode 294c is connected to the third lower gate electrode 224c through the third contact hole 281c.

Next, an optical sensor according to the second exemplary embodiment of the present invention will be described with reference to accompanying drawings.

Figure 8:
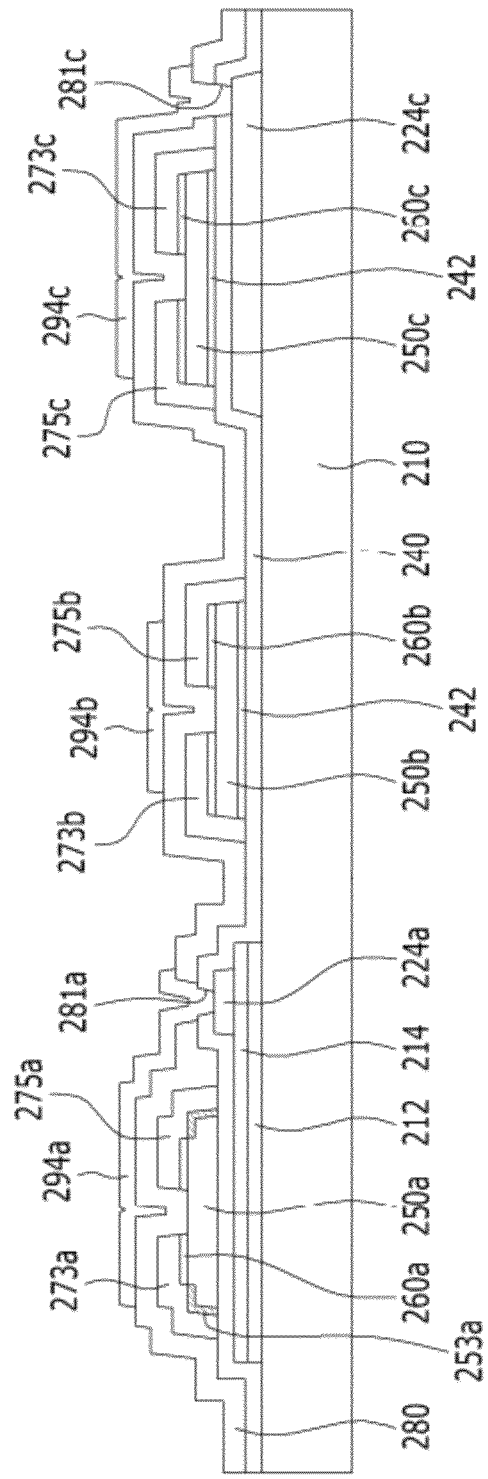
FIG. 8 is a cross-sectional view of an optical sensor taken along line VII-VII' of FIG. 6 according to a second exemplary embodiment of the present invention.

FIG. 6 is a top plan view of an optical sensor according to an exemplary embodiment of the present invention, and FIG. 8 is a cross-sectional view of an optical sensor taken along line VII-VII' of FIG. 6 according to the second exemplary embodiment of the present invention.

The optical sensor according to the second exemplary embodiment of the present invention includes a substrate 210 made of transparent glass or plastic, a plurality of gate lines 221 and data lines 271 crossing on the substrate 210, the switching thin film transistor SW connected to the gate line 221 and the data line 271, and the infrared ray sensing thin film transistor IR and the visible ray sensing thin film transistor VIS connected to respective switching thin film transistors SW.

A plurality of pixels are defined by the gate lines 221 and the data lines 271, one switching thin film transistor SW and one infrared ray sensing thin film transistor IR may be connected in one pixel, and one switching thin film transistor SW and one visible ray sensing thin film transistor VIS may be connected in an adjacent pixel.

The infrared ray sensing thin film transistor IR includes the first semiconductor layer 250a disposed on the substrate 210, a first semiconductor passivation layer 253a enclosing the upper surface and the side surface of the end portion of the first semiconductor layer 250a, the first ohmic contact layer 260a disposed on the first semiconductor layer 250a, the first source electrode 273a and the first drain electrode 275a disposed on the first ohmic contact layer 260a, the fourth insulating layer 280 disposed on the first source electrode 273a and the first drain electrode 275a, and the first upper gate electrode 294a disposed on the fourth insulating layer 280.

The first semiconductor layer 250a may be formed on amorphous silicon germanium (a-SiGe). The amorphous silicon germanium (a-SiGe) is a material having high quantum efficiency for the infrared ray region. Here, the first semiconductor layer 250a may be made of materials other than amorphous silicon germanium (a-SiGe), and any material having high quantum efficiency for the infrared ray region is possible.

The first semiconductor passivation layer 253a may be formed of silicon germanium oxide (SiGeOx). The first semiconductor passivation layer 253a may be formed by executing plasma oxidation to the first semiconductor layer 250a. The silicon germanium oxide as the material used as the first semiconductor passivation layer 253a may prevent the side surface of the first semiconductor layer 250a from being damaged.

The first source electrode 273a and the first drain electrode 275a are spaced apart, thereby forming the channel in the first semiconductor layer between the first source electrode 273a and the first drain electrode 275a. The first ohmic contact layer 260a is disposed on the first semiconductor layer 250a except for the channel and the portion where the first semiconductor passivation layer 253a is formed. That is, the boundaries of the first semiconductor passivation layer 253a and the first ohmic contact layer 260a accord with each other.

Also, the infrared ray sensing thin film transistor IR may further include the first insulating layer 212 and light blocking member 214 deposited on the substrate 210 and positioned under the first semiconductor layer 250a, the first lower gate electrode 224a disposed on the light blocking member 214, and the second insulating layer 240 disposed on the light blocking member 214 and the first lower gate electrode 224a.

The first insulating layer 212 may be composed of silicon nitride (SiNx), thereby improving adherence between the substrate 210 and the light blocking member 214.

The light blocking member 214 is a layer to prevent the visible rays from being incident to the first semiconductor layer 250a. The first semiconductor layer 250a has high quantum efficiency for the infrared ray region, however it also has high quantum efficiency for the visible ray region, thereby receiving the influence of the visible rays such that an aim is to prevent the visible rays from being incident to the first semiconductor layer 250a. The light blocking member 214 may be made of the amorphous germanium (a-Ge). The infrared rays pass through amorphous germanium (a-Ge) well, however the visible rays are hardly passed. The light blocking member 214 may be made of a compound of amorphous germanium instead of amorphous germanium (a-Ge), and any material through which the infrared rays pass well and the visible rays are hardly passed is possible.

The first lower gate electrode 224a is disposed on a portion of the light blocking member 214. The second insulating layer 240 and the fourth insulating layer 280 have the first contact hole 281a exposing the first lower gate electrode 224a. The first upper gate electrode 294a is connected to the first lower gate electrode 224a through the first contact hole 281a. Accordingly, the first lower gate electrode 224a receives the same voltage as that applied to the first upper gate electrode 294a such that the light blocking member 214 being in a floating state may be prevented.

The visible ray sensing thin film transistor VIS includes the second semiconductor layer 250b disposed on the substrate 210, the second ohmic contact layer 260b disposed on the second semiconductor layer 250b, the second source electrode 273b and the second drain electrode 275b disposed on the second ohmic contact layer 260b, the fourth insulating layer 280 disposed on the second source electrode 273b and the second drain electrode 275b, and the second gate electrode 294b disposed on the fourth insulating layer 280.

The second semiconductor layer 250b may be made of amorphous silicon (a-Si). The amorphous silicon (a-Si) is a material having high quantum efficiency for the visible ray region, thereby having high sensitivity for the visible ray region even though the light of the infrared ray region is incident. Here, the second semiconductor layer 250b may be made of materials other than amorphous silicon (a-Si), and any material having high quantum efficiency for the visible ray region is possible.

The second source electrode 273b and the second drain electrode 275b are spaced apart, thereby forming the channel in the second semiconductor layer 250b. The second ohmic contact layer 260b is disposed on the second semiconductor layer 250b except for the channel.

The switching thin film transistor SW includes the third semiconductor layer 250c disposed on the substrate 210, the third ohmic contact layer 260c disposed on the third semiconductor layer 250c, the third source electrode 273c and the third drain electrode 275c disposed on the third ohmic contact layer 260c, the fourth insulating layer 280 disposed on the third source electrode 273c and the third drain electrode 275c, and the third upper gate electrode 294c disposed on the fourth insulating layer 280.

The third semiconductor layer 250c may be made of amorphous silicon (a-Si).

The third source electrode 273c and the third drain electrode 275c are spaced apart, thereby forming the channel in the third semiconductor layer 250c. The third ohmic contact layer 260c is disposed on the third semiconductor layer 250c except for the channel.

The third source electrode 273c is connected to the data line 271, thereby receiving the data voltage from the data line 271.

The third drain electrode 275c is connected to the first source electrode 273a in the pixel where the switching thin film transistor SW is connected to the infrared ray sensing thin film transistor IR. The third drain electrode 275c is connected to the second source electrode 273b in the pixel where the switching thin film transistor SW is connected to the visible ray sensing thin film transistor VIS.

The switching thin film transistor SW further includes the third lower gate electrode 224c disposed on the substrate 210 and positioned under the third semiconductor layer 250c and the second insulating layer 240 disposed on the third lower gate electrode 224c.

The second insulating layer 240 and the fourth insulating layer 280 have the third contact hole 281c exposing the third lower gate electrode 224c. The third upper gate electrode 294c is connected to the third lower gate electrode 224c through the third contact hole 281c.

Next, a manufacturing method of the optical sensor according to the first exemplary embodiment of the present invention will be described with reference to accompanying drawings.

FIG. 9A to FIG. 9I are cross-sectional views showing a manufacturing method of an optical sensor according to the first exemplary embodiment of the present invention.

Firstly, as shown in FIG. 9A, the first insulating layer 212 and the light blocking member 214 are deposited and formed on the substrate 210 made of transparent glass or plastic. The first insulating layer 212 and the light blocking member 214 are patterned through the same mask.

The first insulating layer 212 may be made of silicon nitride (SiNx), and is a layer to improve adherence between the substrate 210 and the light blocking member 214.

The light blocking member 214 is made of a material that blocks the incident visible rays. For example, the light blocking member 214 may be made of the amorphous germanium (a-Ge). The infrared rays pass well through amorphous germanium (a-Ge), however the visible rays are hardly passed. The light blocking member 214 may be made of a compound of amorphous germanium instead of amorphous germanium (a-Ge), and any material through which the infrared rays pass well and the visible rays hardly pass is possible.

Figure 9B:
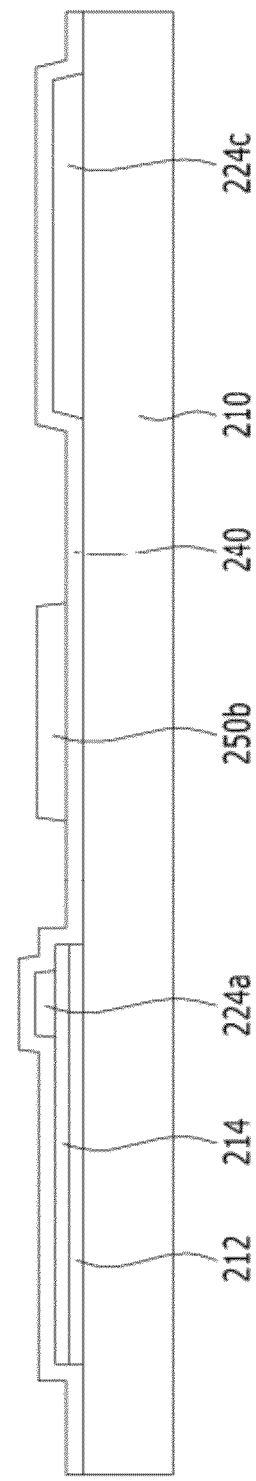

As shown in FIG. 9B, the first lower gate electrode 224a is formed on a portion of the light blocking member 214, and the third lower gate electrode 224c is formed on the substrate 210. The first lower gate electrode 224a and the third lower gate electrode 224c may be made of the same conductive material and are patterned through the same mask.

Next, the second insulating layer 240 is formed on the whole surface of the substrate 210 including the light blocking member 214, the first lower gate electrode 224a, and the third lower gate electrode 224c.

Figure 9C:
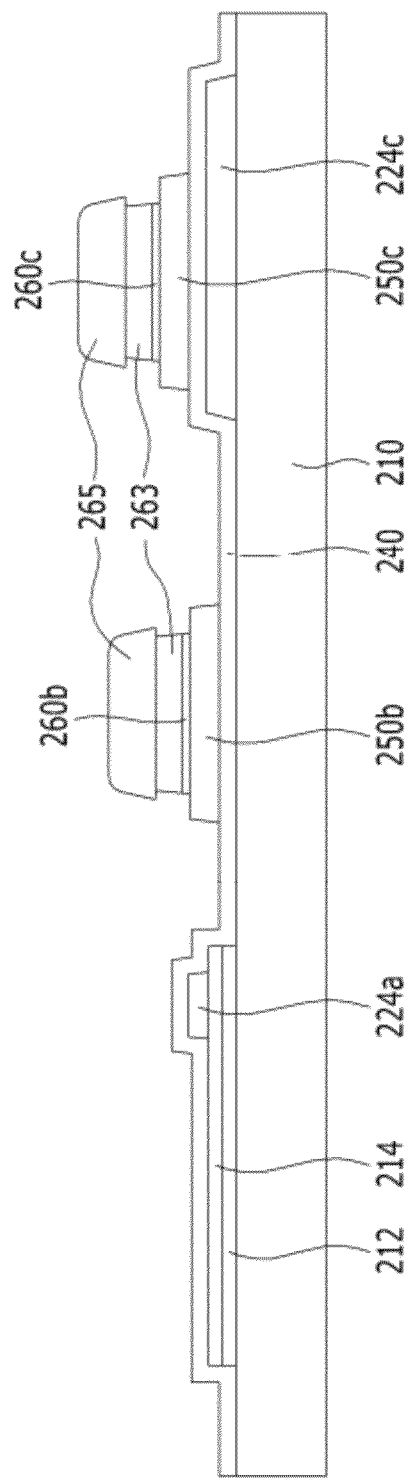

As shown in FIG. 9C, the second semiconductor layer 250b and the second ohmic contact layer 260b on the substrate 210, and the third semiconductor layer 250c and the third ohmic contact layer 260c on the third lower gate electrode 224c are deposited and formed. An etch stopper 263 is continuously deposited on the second ohmic contact layer 260b and the third ohmic contact layer 260c, and a photoresist 265 is coated on the etch stopper 263. The photoresist 265 is patterned by using a mask (not shown), and the second semiconductor layer 250b, the third semiconductor layer 250c, the second ohmic contact layer 260b, the third ohmic contact layer 260c, and the etch stopper 263 under the patterned photoresist 265 are patterned and formed.

The second semiconductor layer 250b and the third semiconductor layer 250c may be formed with the same material, for example the amorphous silicon (a-Si). The amorphous silicon (a-Si) is a material having high quantum efficiency for a visible ray region such that it has high sensitivity to the visible rays even though the infrared rays are incident together therewith. Here, the second semiconductor layer 250b and the third semiconductor layer 250c may be made of materials other than amorphous silicon (a-Si), and any material having high quantum efficiency for the visible ray region is possible.

The second ohmic contact layer 260b and the third ohmic contact layer 260c may be formed with the same material.

The etch stopper 263 may be formed by depositing three layers such as molybdenum/aluminum/molybdenum (Mo/Al/Mo).

The etch stopper 263 may be corroded by a chlorine-based gas (including Cl$_2$) used to etch the semiconductor layer, thereby the second ohmic contact layer 260b, the third ohmic contact layer 260c, the second semiconductor layer 250b, and the third semiconductor layer 250c positioned under the etch stopper 263 may be deteriorated. Accordingly, a post-process may be further included to prevent the corrosion of the etch stopper 263.

Also, a process for removing a portion of the second ohmic contact layer 260b and the third ohmic contact layer 260c that are exposed to the outside may be further included.

Figure 9D:
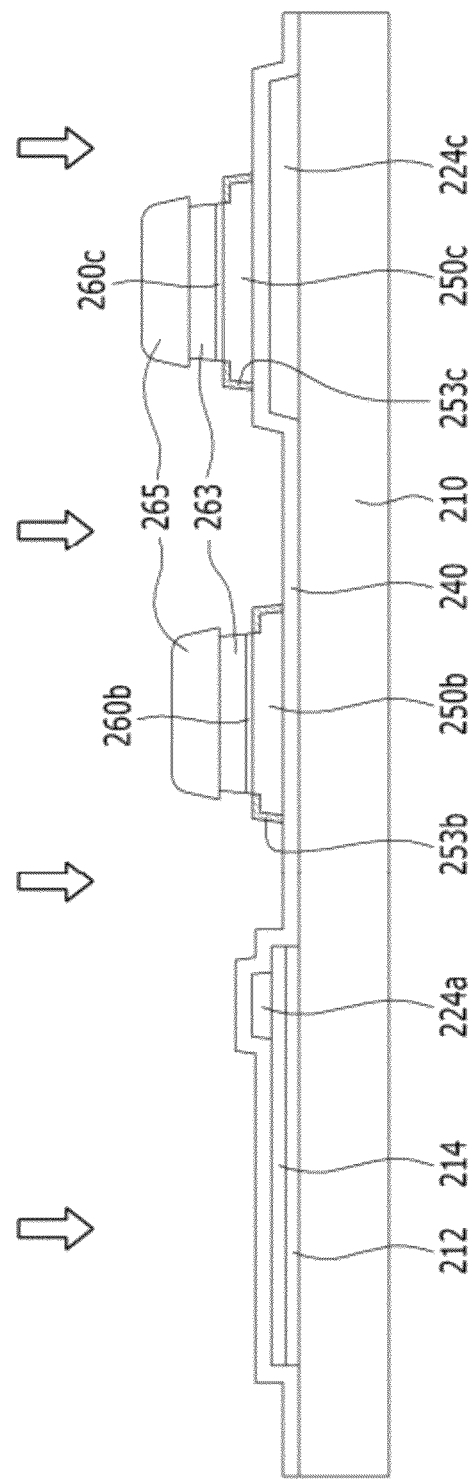

As shown in FIG. 9D, a plasma oxidation treatment is executed to the exposed portions of the second semiconductor layer 250b and the third semiconductor layer 250c to form the second semiconductor passivation layer 253b enclosing the upper surface and the side surface of the end portion of the second semiconductor layer 250b, and the third semiconductor passivation layer 253c enclosing the upper surface and the side surface of the end portion of the third semiconductor layer 250c.

If oxygen plasma is applied to the entire substrate 210 in a vacuum chamber, the exposed portions of the second semiconductor layer 250b and the third semiconductor layer 250c are oxidized. Accordingly, the amorphous silicon (a-Si) positioned at the upper surface and the side surface of the end portions of the second semiconductor layer 250b and the third semiconductor layer 250c is changed into silicon oxide (SiOx) such that the second semiconductor passivation layer 253b and the third semiconductor passivation layer 253c are formed.

The second semiconductor layer 250b and the third semiconductor layer 250c are formed with the same material such that the second semiconductor passivation layer 253b and the third semiconductor passivation layer 253c are also formed with the same material.

Figure 9E:
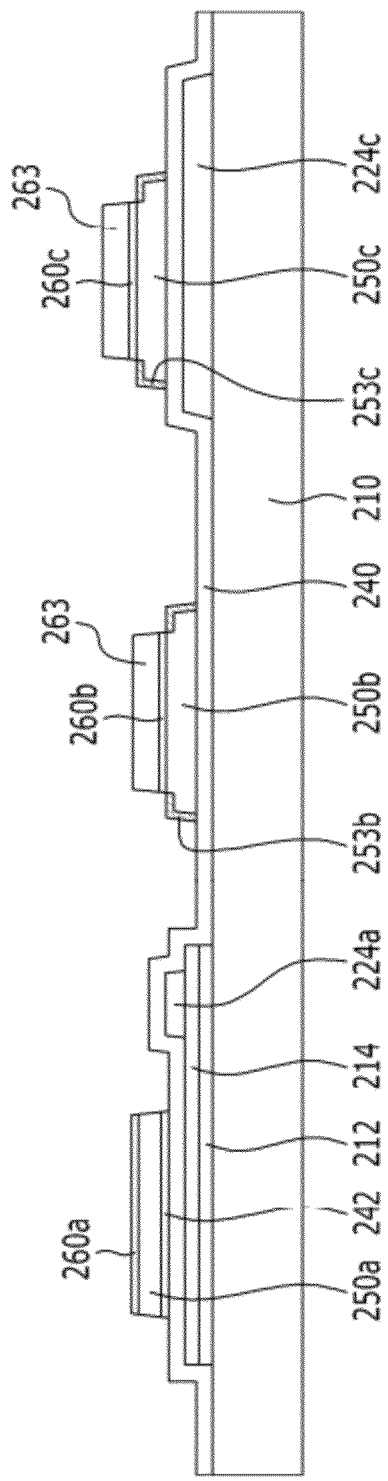

As shown in FIG. 9E, the third insulating layer 242, the first semiconductor layer 250a, and the first ohmic contact layer 260a are deposited and formed on the light blocking member 214, and the photoresist 265 is removed.

The third insulating layer 242 may be made of silicon nitride (SiNx). The previous second semiconductor layer 250b and third semiconductor layer 250c are etched in the vacuum chamber, and the first semiconductor layer 250a is also etched in the vacuum chamber, however when the substrate 210 is disposed outside the vacuum chamber between the processes thereof, the oxidation is generated in the interface between existing layers and subsequent layers such that the characteristics of the sensor may be deteriorated. To prevent this, the third insulating layer 242 is formed between the second insulating layer 240 and the first semiconductor layer 250a such that the interface characteristics thereof are improved.

The first semiconductor layer 250a may be formed of amorphous silicon germanium (a-SiGe). The amorphous silicon germanium (a-SiGe) is a material having high quantum efficiency for the infrared ray region. Here, the first semiconductor layer 250a may be made of materials other than amorphous silicon germanium (a-SiGe), and any material having high quantum efficiency for the infrared ray region is possible.

The first semiconductor layer 250a is patterned through the dry etch process, and at this time, the etch stopper 263 is previously formed on the second semiconductor layer 250b and the third semiconductor layer 250c, and the second semiconductor passivation layer 253b and the third semiconductor passivation layer 253c are previously formed on the upper surface and the side surface of the end portions of the second semiconductor layer 250b and the third semiconductor layer 250c. Accordingly, the second semiconductor layer 250b is protected by the etch stopper 263 and the second semiconductor passivation layer 253b and the third semiconductor layer 250c is protected by the etch stopper 263 and the third semiconductor passivation layer 253c such that the second semiconductor layer 250b and the third semiconductor layer 250c are not affected in the process for forming the first semiconductor layer 250a.

As shown in FIG. 9F, the etch stopper 263 is removed. The etch stopper 263 is a temporary layer to prevent the second semiconductor layer 250b and the third semiconductor layer 250c from being etched together in the process for forming the first semiconductor layer 250a such that the etch stopper 263 is removed after forming the first semiconductor layer 250a.

Figure 9G:
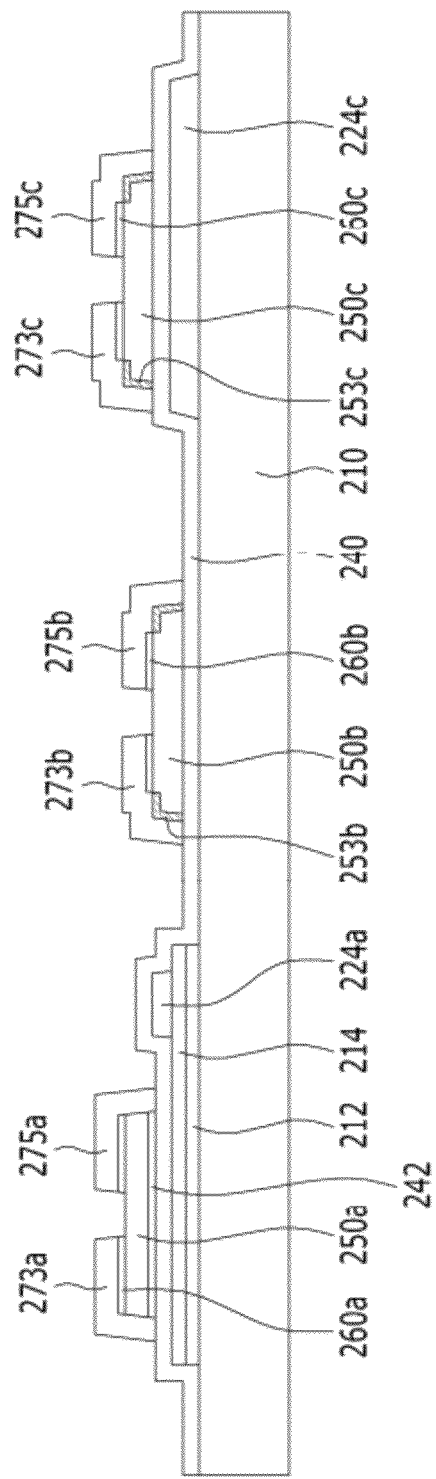

As shown in FIG. 9G, the first source electrode 273a and the first drain electrode 275a are formed on the first ohmic contact layer 260a, the second source electrode 273b and the second drain electrode 275b are formed on the second ohmic contact layer 260b, and the third source electrode 273c and the third drain electrode 275c are formed on the third ohmic contact layer 260c.

The first source electrode 273a and the first drain electrode 275a, the second source electrode 273b and the second drain electrode 275b, and the third source electrode 273c and the third drain electrode 275c are respectively spaced apart, thereby forming the respective channels in the first semiconductor layer 250a, the second semiconductor layer 250b and the third semiconductor layer 250c. Here, the first ohmic contact layer 260a, the second ohmic contact layer 260b, and the third ohmic contact layer 260c corresponding to the respective channels are removed.

As shown in FIG. 9H, the fourth insulating layer 280 is formed on the whole surface of the substrate 210 including the first source electrode 273a, the first drain electrode 275a, the second source electrode 273b, the second drain electrode 275b, the third source electrode 273c, and the third drain electrode 275c.

Next, the first contact hole 281a exposing the first lower gate electrode 224a and the third contact hole 281c exposing the third lower gate electrode 224c are formed in the second insulating layer 240 and the fourth insulating layer 280.

Figure 9I:
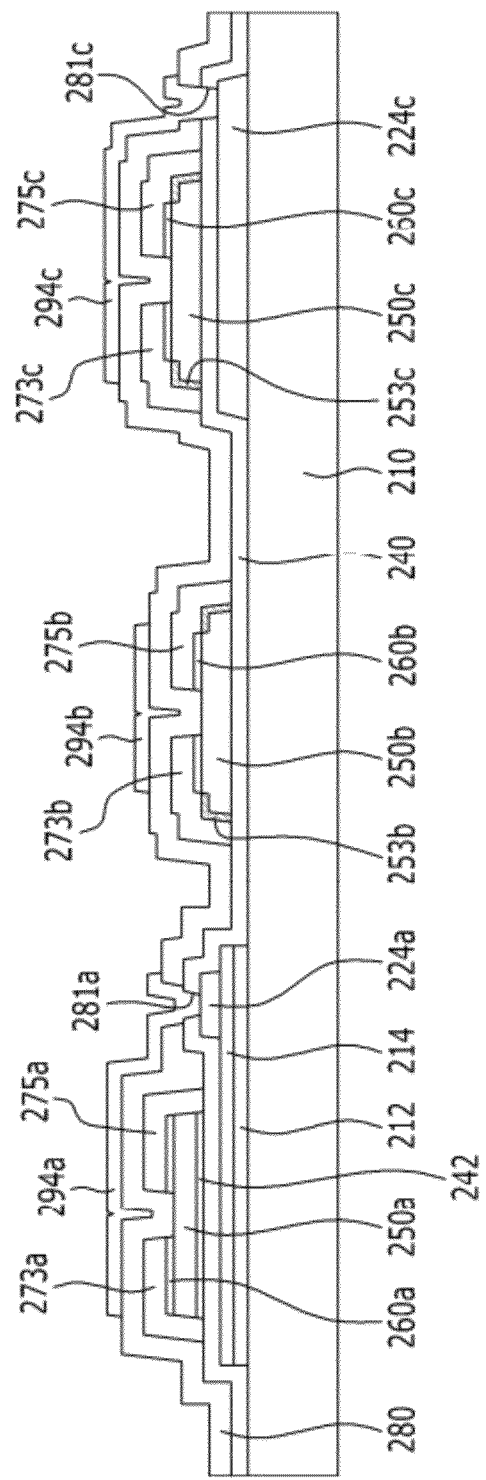

As shown in FIG. 9I, the first upper gate electrode 294a corresponding to the first source electrode 273a and the first drain electrode 275a, the second gate electrode 294b corresponding to the second source electrode 273b and the second drain electrode 275b, and the third upper gate electrode 294c corresponding to the third source electrode 273c and the third drain electrode 275c are formed on the fourth insulating layer 280.

The first upper gate electrode 294a is connected to the first lower gate electrode 224a through the first contact hole 281a, and the third upper gate electrode 294c is connected to the third lower gate electrode 224c through the third contact hole 281c.

Next, a manufacturing method of the optical sensor according to the second exemplary embodiment of the present invention will be described with reference to accompanying drawings.

FIG. 10A to FIG. 10I are cross-sectional views showing a manufacturing method of an optical sensor according to the second exemplary embodiment of the present invention.

Figure 10A:
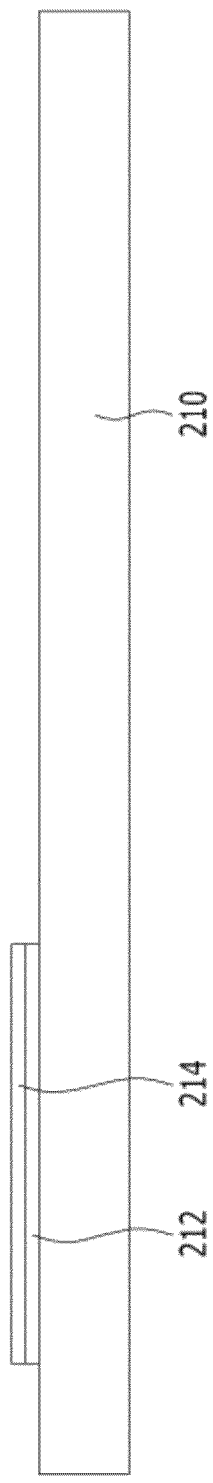
FIG. 10A, FIG. 10B, FIG. 10C, FIG. 10D, FIG. 10E, FIG. 10F, FIG. 10G, FIG. 10H and FIG. 10I are cross-sectional views of an exemplary embodiment of a manufacturing method of an optical sensor according to the second exemplary embodiment of the present invention.

Firstly, as shown in FIG. 10A, a first insulating layer 212 and a light blocking member 214 are deposited and formed on a substrate 210 made of transparent glass or plastic. The first insulating layer 212 and the light blocking member 214 are patterned through the same mask.

The first insulating layer 212 may be made of silicon nitride (SiNx), and is a layer to improve adherence between the substrate 210 and the light blocking member 214.

The light blocking member 214 is made of a material that blocks incident visible rays. For example, the light blocking member 214 may be made of amorphous germanium (a-Ge). The infrared rays pass through amorphous germanium (a-Ge) well, however the visible rays are hardly passed. The light blocking member 214 may be made of a compound of amorphous germanium instead of amorphous germanium (a-Ge), and any material through which the infrared rays pass well and the visible rays are hardly passed is possible.

Figure 10B:
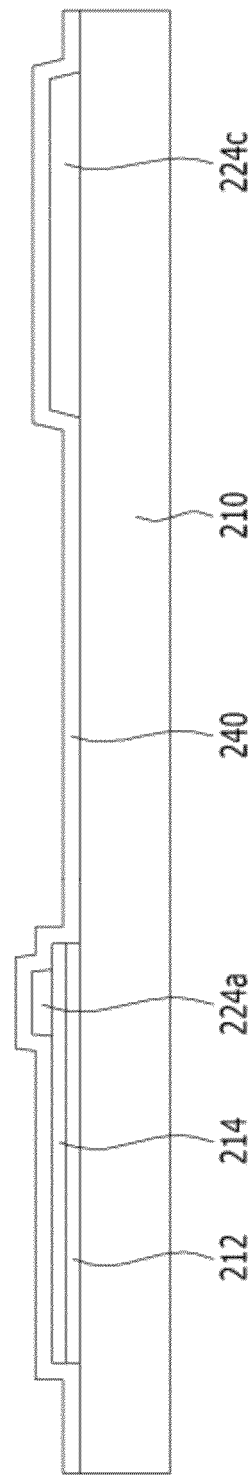

As shown in FIG. 10B, a first lower gate electrode 224a is formed on a portion of the light blocking member 214, and a third lower gate electrode 224c is formed on the substrate 210. The first lower gate electrode 224a and the third lower gate electrode 224c may be made of the same conductive material and are patterned through the same mask.

Next, the second insulating layer 240 is formed on the whole surface of the substrate 210 including the light blocking member 214, the first lower gate electrode 224a, and the third lower gate electrode 224c.

Figure 10C:
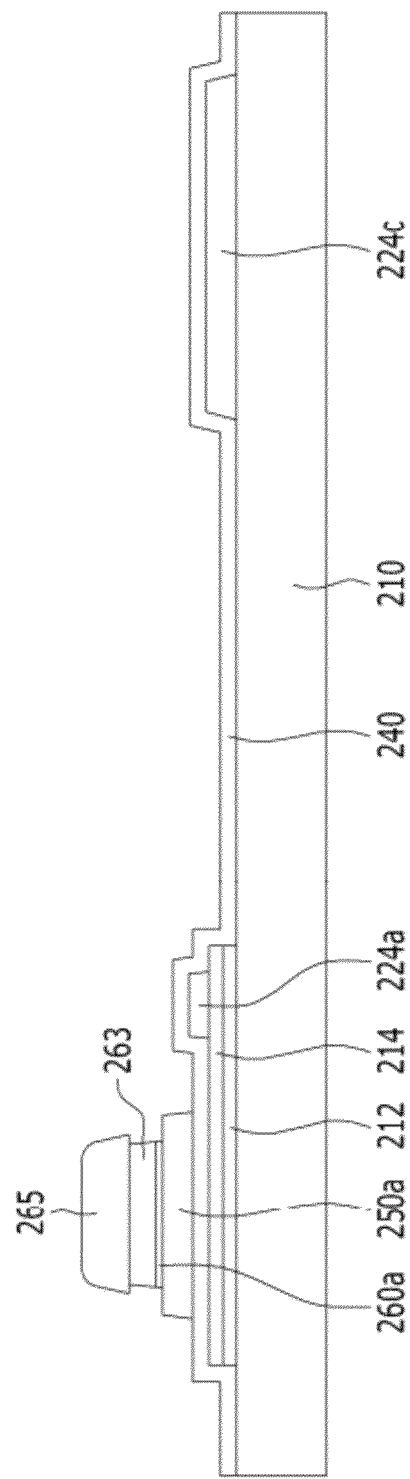

As shown in FIG. 10C, a first semiconductor layer 250a, a first ohmic contact layer 260a, and an etch stopper 263 are continuously deposited on the substrate 210, and a photoresist 265 is coated on the etch stopper 263. The photoresist 265 is patterned by using a mask (not shown), and the first semiconductor layer 250a, the first ohmic contact layer 260a, and the etch stopper 263 under the patterned photoresist 265 are patterned.

The first semiconductor layer 250a may be formed of amorphous silicon germanium (a-SiGe). The amorphous silicon germanium (a-SiGe) is a material having high quantum efficiency for the infrared ray region. Here, the first semiconductor layer 250a may be made of materials other than amorphous silicon germanium (a-SiGe), and any material having high quantum efficiency for the infrared ray region is possible.

The etch stopper 263 may be formed by depositing three layers such as molybdenum/aluminum/molybdenum (Mo/Al/Mo).

The etch stopper 263 may be corroded by a chlorine based gas (including $Cl_2$) used to etch the semiconductor layer, and thereby the first ohmic contact layer 260a the first semiconductor layer 250a positioned under the etch stopper 263 may be deteriorated. Accordingly, a post-process may be further included to prevent the corrosion of the etch stopper 263.

Also, a process for removing a portion of the first ohmic contact layer 260a that is exposed to the outside may be further included.

Figure 10D:
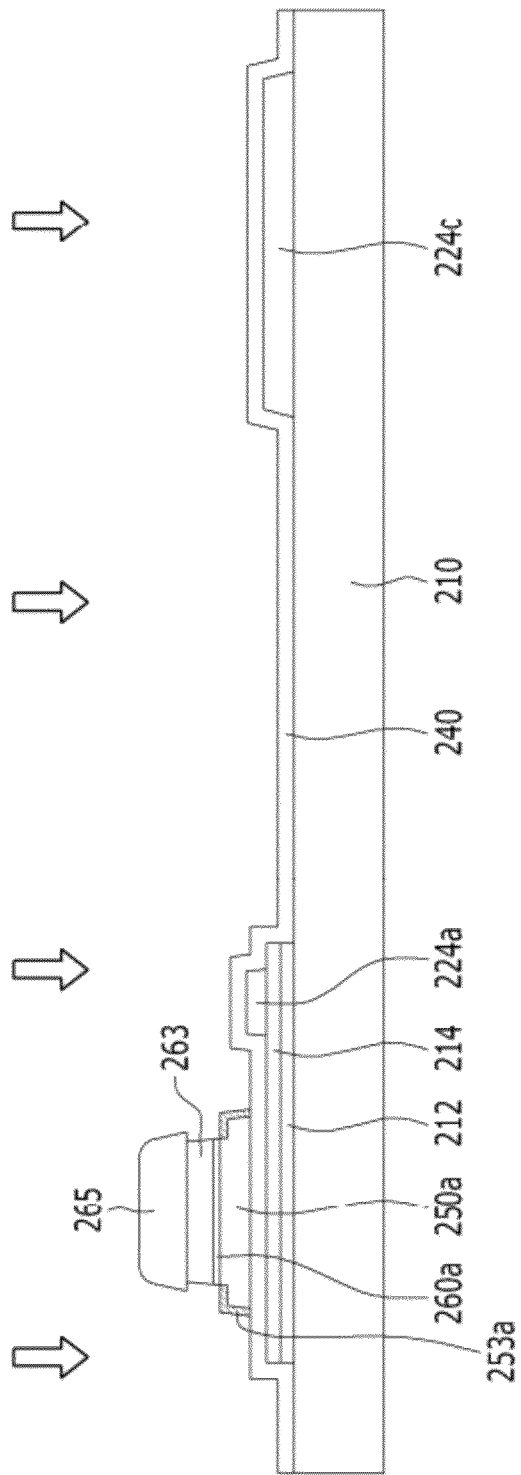

As shown in FIG. 10D, a plasma oxidation treatment is executed to the exposed portion of the first semiconductor layer 250a to form a first semiconductor passivation layer 253a enclosing the upper surface and the side surface of the end portion of the first semiconductor layer 250a.

If oxygen plasma is applied to the entire substrate 210 in a vacuum chamber, the exposed portion of the first semiconductor layer 250a is oxidized. Accordingly, the amorphous silicon germanium (a-SiGe) positioned at the upper surface and the side surface of the end portion of the first semiconductor layer 250a is changed into silicon germanium oxide (SiGeOx) such that the first semiconductor passivation layer 253a is formed.

Figure 10E:
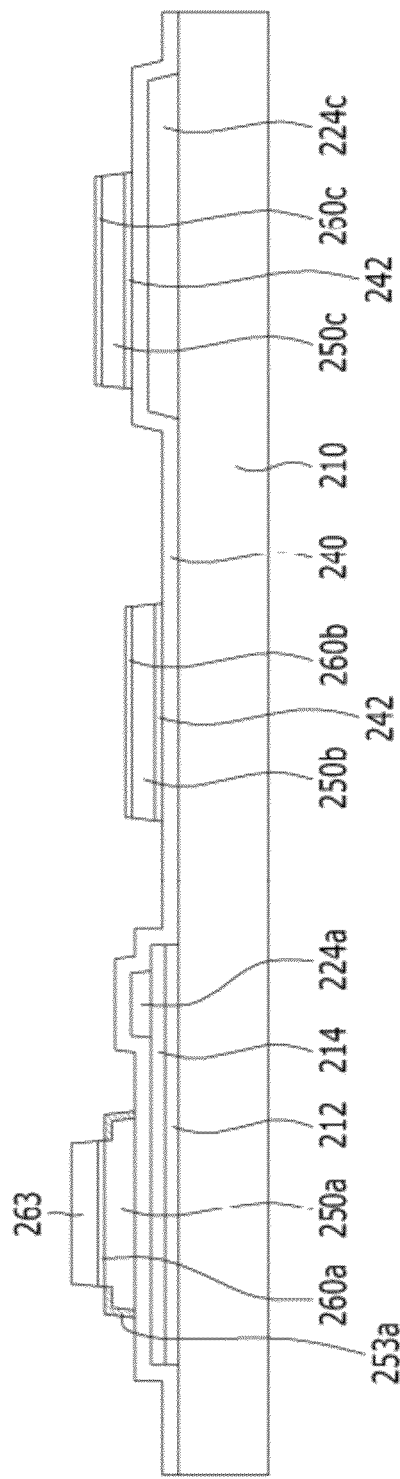

As shown in FIG. 10E, a third insulating layer 242 is formed on the substrate 210, and the second semiconductor layer 250b and the third semiconductor layer 250c are formed on the third insulating layer 242 and the second ohmic contact layer 260b and the third ohmic contact layer 260c are deposited on the second semiconductor layer 250b and the third semiconductor layer 250c.

Next, the photoresist 265 on the etch stopper 263 is removed.

The third insulating layer 242 may be made of silicon nitride (SiNx). The previous first semiconductor layer 250a is etched in the vacuum chamber, and the second semiconductor layer 250b and the third semiconductor layer 250c are also etched in the vacuum chamber, however when the substrate 210 is disposed outside the vacuum chamber between the processes thereof, oxidation is generated in the interface therebetween such that the characteristics of the sensor may be deteriorated. To prevent this, the third insulating layer 242 is formed between a second insulating layer 240 and the second and the third semiconductor layers 250b and 250c such that the interface characteristics are improved.

The second semiconductor layer 250b and the third semiconductor layer 250c may be formed with the same material, for example the amorphous silicon (a-Si). The amorphous silicon (a-Si) is a material having high quantum efficiency for a visible ray region such that it has high sensitivity to the visible rays even though the infrared rays are incident together therewith. Here, the second semiconductor layer 250b and the third semiconductor layer 250c may be made of materials other than amorphous silicon (a-Si), and any material having high quantum efficiency for the visible ray region is possible.

The second semiconductor layer 250b and the third semiconductor layer 250c are patterned through the dry etch process, and at this time, the etch stopper 263 is previously formed on the first semiconductor layer 250a, and the first semiconductor passivation layer 253a is previously formed on the upper surface and the side surface of the end portion of the first semiconductor layer 250a. Accordingly, the first semiconductor layer 250a is protected by the etch stopper 263 and the first semiconductor passivation layer 253a such that the first semiconductor layer 250a is not affected in the process for forming the second semiconductor layer 250b and the third semiconductor layer 250c.

Figure 10F:
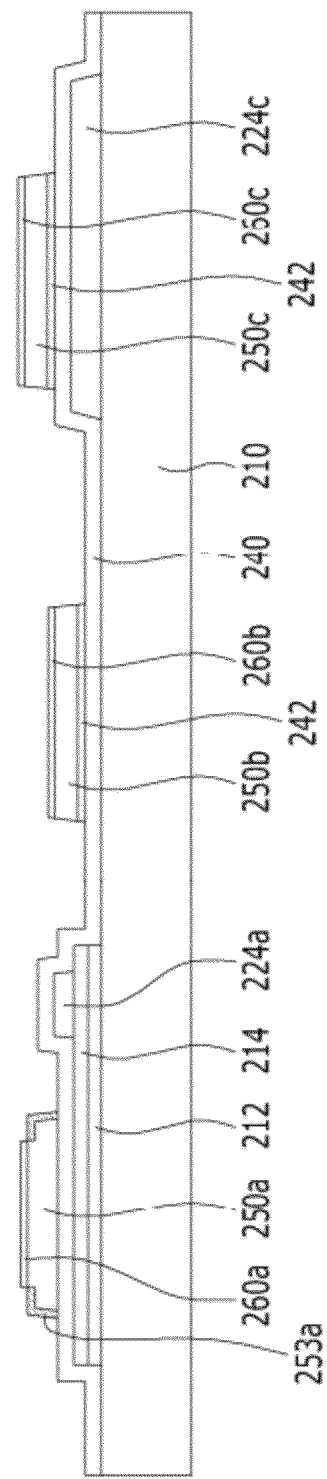

As shown in FIG. 10F, the etch stopper 263 is removed. The etch stopper 263 is a temporary layer to prevent the first semiconductor layer 250a from being etched together in the process forming the second semiconductor layer 250b and the third semiconductor layer 250c such that the etch stopper is removed after forming the second semiconductor layer 250b and the third semiconductor layer 250c.

Figure 10G:
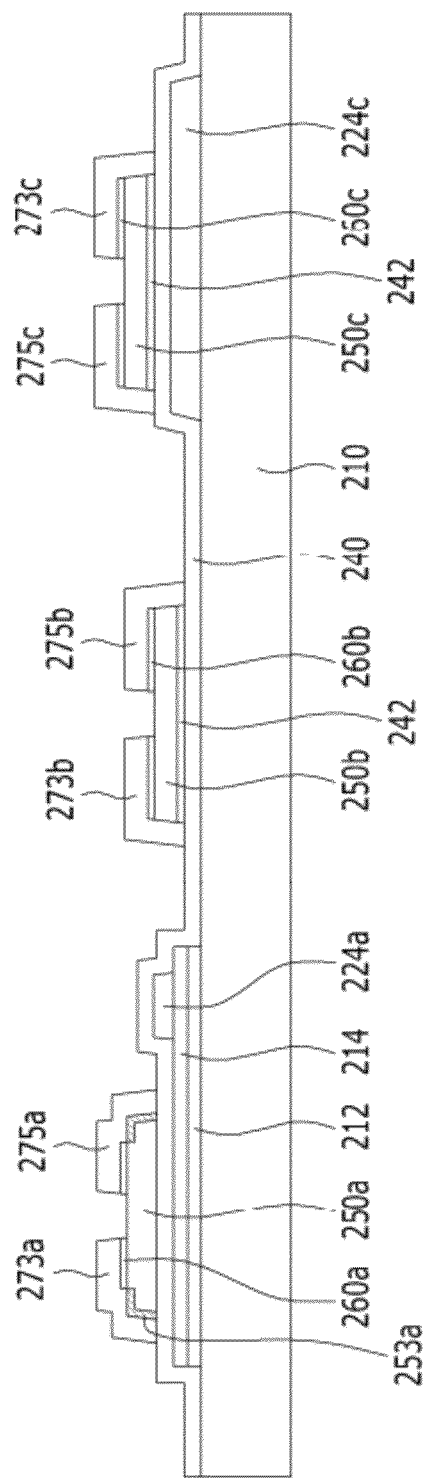

As shown in FIG. 10G, a first source electrode 273a and a first drain electrode 275a are formed on the first ohmic contact layer 260a, a second source electrode 273b and a second drain electrode 275b are formed on the second ohmic contact layer 260b, and a third source electrode 273c and a third drain electrode 275c are formed on the third ohmic contact layer 260c.

The first source electrode 273a and the first drain electrode 275a, the second source electrode 273b and the second drain electrode 275b, and the third source electrode 273c and the third drain electrode 275c are respectively spaced apart, thereby forming respective channels in the first semiconductor layer 250a, the second semiconductor layer 250b and the third semiconductor layer 250c. Here, the first ohmic contact layer 260a, the second ohmic contact layer 260b, and the third ohmic contact layer 260c corresponding to the respective channels are removed.

Figure 10H:
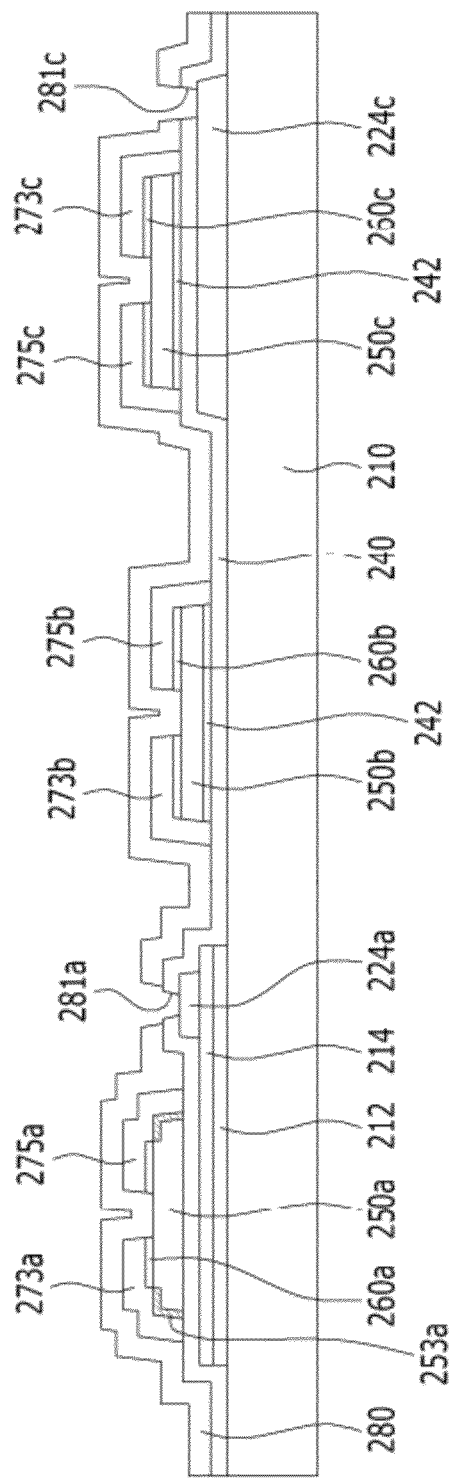

As shown in FIG. 10H, a fourth insulating layer 280 is formed on the whole surface of the substrate 210 including the first source electrode 273a, the first drain electrode 275a, the second source electrode 273b, the second drain electrode 275b, the third source electrode 273c, and the third drain electrode 275c.

Next, a first contact hole 281a exposing the first lower gate electrode 224a and a third contact hole 281c exposing the third lower gate electrode 224c are formed in the second insulating layer 240 and the fourth insulating layer 280.

Figure 10I:
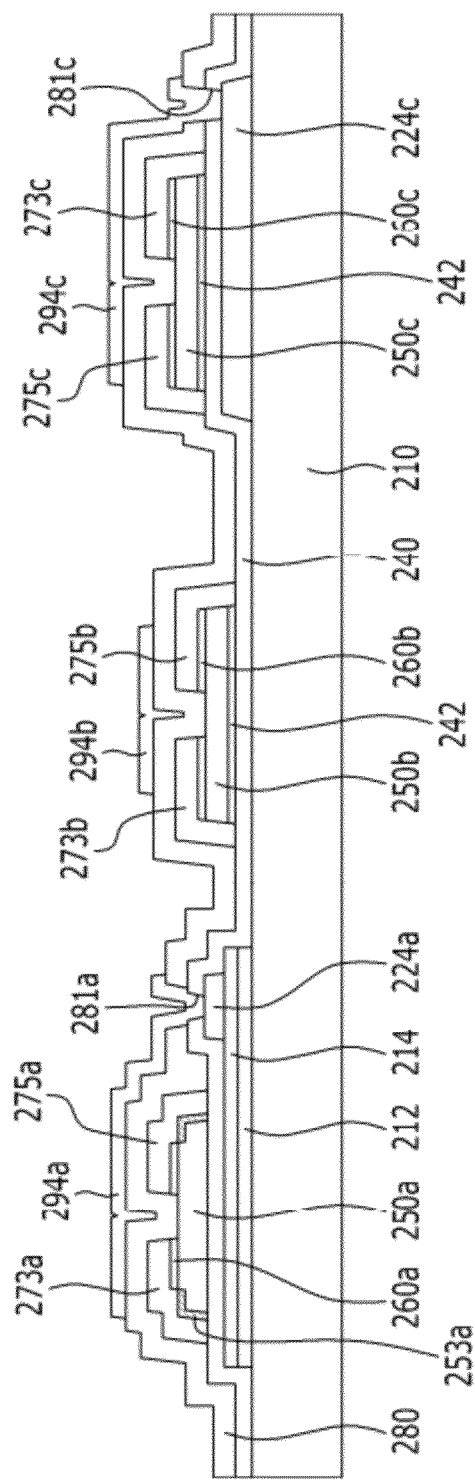

As shown in FIG. 10I, a first upper gate electrode 294a corresponding to the first source electrode 273a and the first drain electrode 275a, a second gate electrode 294b corresponding to the second source electrode 273b and the second drain electrode 275b, and a third upper gate electrode 294c corresponding to the third source electrode 273c and the third drain electrode 275c are formed on the fourth insulating layer 280.

The first upper gate electrode 294a is connected to the first lower gate electrode 224a through the first contact hole 281a, and the third upper gate electrode 294c is connected to the third lower gate electrode 224c through the third contact hole 281c.

In the manufacturing method of the optical sensor of the present invention, the semiconductor passivation layer enclosing the upper surface and the side surface of the end portion of the semiconductor layer is firstly formed such that the semiconductor layer that is previously formed may be prevented from being damaged by the etch process of the semiconductor layer that is formed later, and this may be confirmed through exemplary experimental observation.

Figure 11:
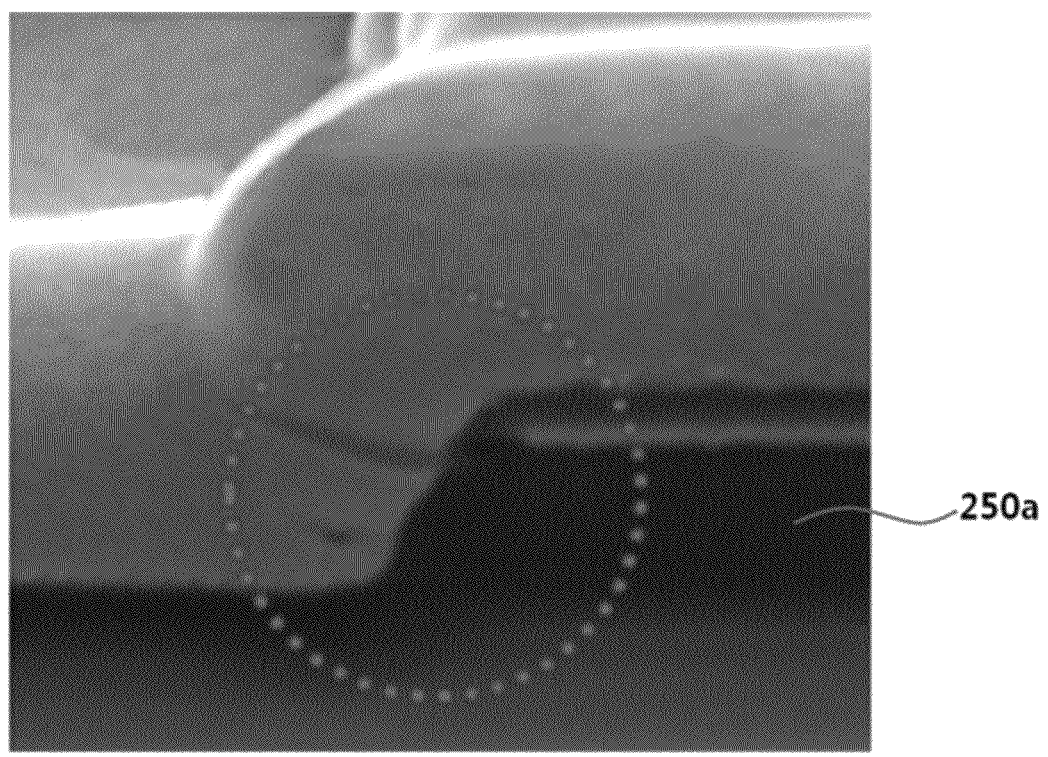
FIG. 11 and FIG. 12 are views of a semiconductor layer of an optical sensor manufactured according to an exemplary embodiment of the present invention.
Figure 12:
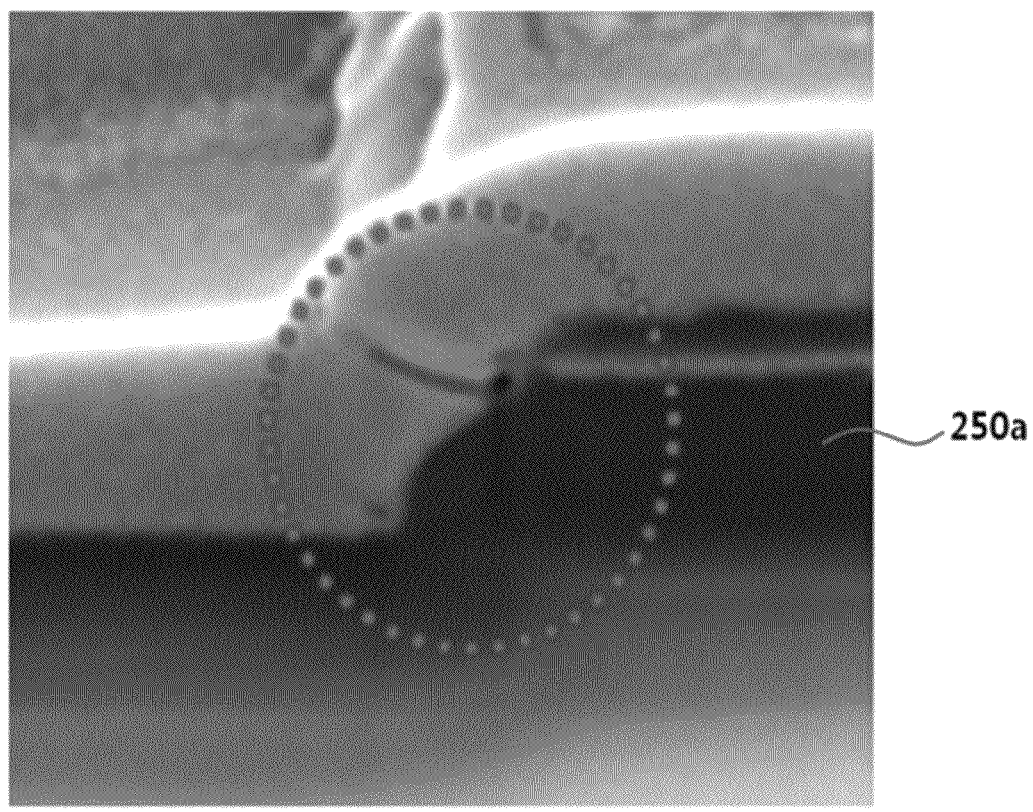

FIG. 11 and FIG. 12 are views of a first semiconductor layer of an optical sensor manufactured according to an exemplary embodiment of the present invention.

According to FIG. 11 and FIG. 12, it may be confirmed that the semiconductor layer that is previously formed is maintained without damage in the following processes.

The above-described optical sensor and manufacturing method thereof according to the present invention have the effects as follows.

In the optical sensor and the manufacturing method thereof according to exemplary embodiments of the present invention, when forming the semiconductor layer of the visible ray sensing thin film transistor and the switching thin film transistor before the semiconductor layer of the infrared ray sensing thin film transistor, the semiconductor passivation layer enclosing the upper surface and the side surface of the end portions of the semiconductor layer of the visible ray sensing thin film transistor and the switching thin film transistor is formed such that damage of the side surface of the semiconductor layers may be prevented, and thereby disconnection and a short circuit of the source and the drain electrodes may be prevented.

Also, in the optical sensor and the manufacturing method thereof according to exemplary embodiments of the present invention, when forming the semiconductor layer of the infrared ray sensing thin film transistor before the semiconductor layers of the visible ray sensing thin film transistor and the switching thin film transistor, the semiconductor passivation layer enclosing the upper surface and the side surface of the end portion of the semiconductor layer of the infrared ray sensing thin film transistor is formed such that damage to the side surface of the semiconductor layer may be prevented, thereby preventing disconnection and a short circuit of the source and the drain electrodes.

Further, in the optical sensor and the manufacturing method thereof according to exemplary embodiments of the present invention, the third insulating layer is formed under the semiconductor layer such that the characteristics of the sensor may be prevented from becoming deteriorated due to an interface oxidation by exposing the layers outside the vacuum state in the middle process of forming the plurality of layers through a CVD process.

Also, in the optical sensor and the manufacturing method thereof according to exemplary embodiments of the present invention, the post-processing is executed after the formation of the etch stopper such that the etch stopper being corroded and the semiconductor layer being affected may be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical sensor, comprising:
  a substrate;
  an infrared ray sensing thin film transistor comprising a first semiconductor layer disposed on the substrate;
  a visible ray sensing thin film transistor comprising a second semiconductor layer disposed on the substrate;
  a switching thin film transistor comprising a third semiconductor layer disposed on the substrate; and a passivation layer disposed directly on an upper surface and a side surface of an end portion of at least one of the first semiconductor layer, the second semiconductor layer, and the third semiconductor layer.

2. The optical sensor of claim 1, wherein
the passivation layer is disposed on the upper surface and the side surface of the end portions of the second semiconductor layer and the third semiconductor layer.

3. The optical sensor of claim 2, wherein
the passivation layer comprises silicon oxide.

4. The optical sensor of claim 3, wherein
the second semiconductor layer comprises amorphous silicon, and
the third semiconductor layer comprises amorphous silicon.

5. The optical sensor of claim 4, wherein
the passivation layer comprises a plasma oxidation treated portion of the second semiconductor layer and the third semiconductor layer.

6. The optical sensor of claim 5, wherein
the first semiconductor layer comprises amorphous silicon germanium.

7. The optical sensor of claim 2, further comprising:
an insulating layer disposed on the substrate; and
the first semiconductor layer being disposed on the insulating layer.

8. The optical sensor of claim 7, wherein
the insulating layer comprises silicon nitride.

9. The optical sensor of claim 2, wherein
the infrared ray sensing thin film transistor further comprises:
a first insulating layer and a light blocking member disposed on the substrate;
a lower gate electrode disposed on the light blocking member;
a second insulating layer disposed on the light blocking member and the lower gate electrode;
an ohmic contact layer disposed on the first semiconductor layer;
a source electrode and a drain electrode disposed on the ohmic contact layer;
a third insulating layer disposed on the source electrode and the drain electrode;
a contact hole in the second insulating layer and the third insulating layer and exposing the lower gate electrode; and
an upper gate electrode disposed on the third insulating layer and connected to the lower gate electrode through the contact hole,
wherein the first semiconductor layer is disposed on the second insulating layer.

10. The optical sensor of claim 2, wherein
the visible ray sensing thin film transistor further comprises:
an ohmic contact layer disposed on the second semiconductor layer;
a source electrode and a drain electrode disposed on the ohmic contact layer;
an insulating layer disposed on the source electrode and the drain electrode; and
a second gate electrode disposed on the insulating layer.

11. The optical sensor of claim 1, wherein
the passivation layer is disposed on the upper surface and the side surface of the end portion of the first semiconductor layer.

12. An optical sensor, comprising:
a substrate;
an infrared ray sensing thin film transistor comprising a first semiconductor layer disposed on the substrate;
a visible ray sensing thin film transistor comprising a second semiconductor layer disposed on the substrate;
a switching thin film transistor comprising a third semiconductor layer disposed on the substrate; and
a passivation layer disposed on an upper surface and a side surface of an end portion of the first semiconductor layer,
wherein the passivation layer comprises silicon germanium oxide.

13. The optical sensor of claim 12, wherein
the first semiconductor layer comprises amorphous silicon germanium.

14. The optical sensor of claim 13, wherein
the passivation layer comprises a plasma oxidation treated portion of the first semiconductor layer.

15. The optical sensor of claim 14, wherein
the second semiconductor layer comprises amorphous silicon germanium, and the third semiconductor layer comprises amorphous silicon germanium.

16. The optical sensor of claim 11, further comprising:
an insulating layer disposed on the substrate; and
the second semiconductor layer and the third semiconductor layer being disposed on the insulating layer.

17. The optical sensor of claim 16, wherein
the insulating layer comprises silicon nitride.

18. The optical sensor of claim 11, wherein
the infrared ray sensing thin film transistor further comprises:
a first insulating layer and light blocking member disposed on the substrate;
a lower gate electrode disposed on the light blocking member;
a second insulating layer disposed on the light blocking member and the lower gate electrode;
an ohmic contact layer disposed on the first semiconductor layer;
a source electrode and a drain electrode disposed on the ohmic contact layer;
a third insulating layer disposed on the source electrode and the drain electrode;
a contact hole in the second insulating layer and the third insulating layer and exposing the lower gate electrode; and
an upper gate electrode disposed on the third insulating layer and connected to the lower gate electrode through the contact hole,
wherein the first semiconductor layer is disposed on the second insulating layer.

19. The optical sensor of claim 11, wherein
the visible ray sensing thin film transistor further comprises:
an ohmic contact layer disposed on the second semiconductor layer;
a source electrode and a drain electrode disposed on the ohmic contact layer;
an insulating layer disposed on the source electrode and the drain electrode; and
a gate electrode disposed on the insulating layer.

20. An optical sensor, comprising:
a substrate;
a first sensing thin film transistor comprising a first semiconductor layer disposed on the substrate;
a second sensing thin film transistor comprising a second semiconductor layer disposed on the substrate;

a switching thin film transistor comprising a third semiconductor layer disposed on the substrate; and a passivation layer disposed directly on at least one of an upper surface and a side surface of a portion of at least one of the first semiconductor layer, the second semiconductor layer, and the third semiconductor layer.

* * * * *